(12) United States Patent
Arts et al.

(10) Patent No.: US 12,161,128 B2
(45) Date of Patent: Dec. 10, 2024

(54) SYSTEM AND METHOD FOR INSPECTING POULTRY SLAUGHTER PRODUCTS

(71) Applicant: MAREL POULTRY B.V., Boxmeer (NL)

(72) Inventors: Stefan Theodorus Petronella Arts, Boxmeer (NL); Engelbertus Johannes Jacobus Teurlinx, Boxmeer (NL); Richard Jozef De Schutter, Boxmeer (NL); Allard Emile Bernardus Martinet, Boxmeer (NL)

(73) Assignee: MAREL POULTRY B.V., Boxmeer (NL)

( * ) Notice: Subject to any disclaimer, the term of this patent is extended or adjusted under 35 U.S.C. 154(b) by 0 days.

(21) Appl. No.: 18/651,961

(22) Filed: May 1, 2024

(65) Prior Publication Data
US 2024/0276993 A1 Aug. 22, 2024

Related U.S. Application Data

(63) Continuation of application No. PCT/EP2023/069514, filed on Jul. 13, 2023.

(30) Foreign Application Priority Data

Aug. 24, 2022 (EP) .................................... 22192039

(51) Int. Cl.
  *A22B 7/00* (2006.01)
(52) U.S. Cl.
  CPC ................... *A22B 7/003* (2013.01)
(58) Field of Classification Search
  CPC ..................................... A22B 7/003
  (Continued)

(56) References Cited

U.S. PATENT DOCUMENTS

| 4,282,633 A | 8/1981 | Graham et al. |
| 4,597,133 A | 7/1986 | van de Nieuwelaar |

(Continued)

FOREIGN PATENT DOCUMENTS

| EP | 3075256 A1 | 10/2016 |
| NL | 8900871 A | 11/1990 |

(Continued)

OTHER PUBLICATIONS

Extended European Search Report from corresponding EP Application No. 22192039.0, Apr. 13, 2023.
(Continued)

*Primary Examiner* — Richard T Price, Jr.
(74) *Attorney, Agent, or Firm* — Workman Nydegger

(57) ABSTRACT

A system for inspecting poultry slaughter products, includes a supply transport line, having successive first product carriers; a discharge transport line, including successive second product carriers; at least two inspection lines, each comprising successive inspection product carriers; each of the first, second and inspection product carriers being configured to carry and transport a respective one of the products. The system has an inspection station along each of the inspection lines, with each inspection station being arranged for inspecting products passing the inspection station while being transported by the associated inspection line during use; and, a first product transfer system for successively transferring products from first product carriers to respective inspection product carriers while distributing the products over all of the at least two inspection lines; a second product transfer system for successively transferring products from inspection product carriers to respective second product carriers of the discharge transport line.

20 Claims, 2 Drawing Sheets

(58) Field of Classification Search
USPC .......................................................... 452/188
See application file for complete search history.

(56) References Cited

U.S. PATENT DOCUMENTS

| | | | |
|---|---|---|---|
| 6,689,963 B2 | 2/2004 | Brook | |
| 6,796,892 B2* | 9/2004 | Allen | A22B 7/00 452/106 |
| 7,798,890 B2 | 9/2010 | Gerrits et al. | |
| 8,862,262 B2* | 10/2014 | Thorsson | A22C 18/00 452/157 |

FOREIGN PATENT DOCUMENTS

| | | |
|---|---|---|
| WO | 9816116 A1 | 4/1998 |
| WO | 2019212335 A1 | 11/2019 |

OTHER PUBLICATIONS

International Search Report from corresponding PCT Application No. PCT/EP2023/069514, Aug. 28, 2023.
Kuanglin Chao et al.: "High-Speed Poultry Inspection Using Visible/Near-infrared Spectrophotometer", Monitoring Food Safety, Agriculture, and Plant Health, Proceedings of SPIE, vol. 5271, Mar. 30, 2004, pp. 51-610.
OpsExcellence: "Takt Time, Cycle Time, Lead Time", Feb. 11, 2015, 2 pages, Retrieved from the internet: URL: https://www.youtube.com/watch?v=isu6MG3v0-s&t=776s.
"Understanding Poultry Inspection", Chicken Roost, Jul. 11, 2014, 8 pages. Retrieved from: https://www.youtube.com/watch?v=VEsNdf-bRiQ.
Chao et al., "A Spectroscopic System for High-Speed Inspection of Poultry Carcasses", Applied Engineering in Agriculture, Sep. 1, 2004, pp. 683-690, vol. 20(5).
Third Party Submission under 37 CFR 1.290 in Related U.S. Appl. No. 18/652,019, filed Sep. 24, 2024.

* cited by examiner

SYSTEM AND METHOD FOR INSPECTING POULTRY SLAUGHTER PRODUCTS

BACKGROUND

The present invention relates to a system for inspecting poultry slaughter products. The invention also relates to a method for inspecting poultry slaughter products.

WO 98/16116 relates to a method and device for inspecting poultry, wherein, for the purpose of enabling an increased conveyor speed, at least two inspectors on a rotating table are moved along with the conveyor however at a velocity lower than that of the poultry moved by said conveyor.

EP 3 075 256 relates to an inspection line in which every second shackle is moved sideways to a position in which the poultry is inspected.

U.S. Pat. No. 4,282,633 discloses an apparatus by means of which birds suspended from hangers or shackles and moving in alignment in series through a processing plant are divided into two lines for inspection by means of lateral urging of alternate ones of the hangers towards an inspector position.

In another known system, of which an example is shown in the YouTube video https://www.youtube.com/watch?v=VEsNdf-bRiQ, three inspectors are positioned next to each other along a poultry conveyor having shackles from which chicken slaughter products are suspended which need to be inspected. The shackles have three different colors in a repetitive pattern of each time three differently-colored successive shackles. Each inspector is allocated a different color and is supposed to only inspect chicken suspended from a shackle having the color to which the inspector is associated.

SUMMARY

It is an object of the invention to provide a system and method for inspecting poultry slaughter products in a reliable manner even at increased line speeds, that means, at line speeds resulting in an increased number of transported poultry slaughter products per unit of time such as per hour. Increased line speeds may be line speeds resulting in the transport of over 6000, 8000 or 10000 products per hour, for example 12000 products per hour.

According to the invention, a system for inspecting poultry slaughter products is provided, for inspecting poultry slaughter products, comprising one supply transport line, comprising successive first product carriers;
  at least one discharge transport line, comprising successive second product carriers;
  at least two inspection lines each comprising successive inspection product carriers;
  each of said first, second and inspection product carriers being configured to carry and transport a respective one of the products;
  the system further comprising
  an inspection station along each of the at least two inspection lines, each inspection station being arranged for inspecting products passing said inspection station while being transported by the associated inspection line during use, and;
  a first product transfer system for successively transferring products from first product carriers of the supply transport line to respective inspection product carriers while distributing the products over all of the at least two inspection lines;
  a second product transfer system for successively transferring products from inspection product carriers to respective second product carriers of the at least one discharge transport line.

By providing the at least two separate inspection lines and the first and second product transfer systems it is possible to distribute slaughter products from the single supply transport line over all of the at least two inspection lines and, downstream of the inspection stations, transfer the slaughter products to the at least one discharge transport line. Consequently, each of the at least two inspection lines may be driven at a substantially lower speed compared to the single supply transport line. For example, in case of two inspection lines, the line speed of each of the two inspection lines may be half of that of the supply transport line. The reduced line speed of each of the inspection lines make possible a very effective and reliable inspection by an individual, or, inspector at the inspection station without the products passing the inspector at the higher line speed of the supply transport line. Inspection at such high line speed may negatively influence the quality of the inspection by the inspector. In other words, the single supply transport line may run at a line speed which is much higher, in the above example of two inspection lines by a factor two, than a line speed of the inspection lines which may be acceptable for or may be set as a maximum line speed for the inspection of the slaughter products. For example, a maximum line speed for the purpose of inspection may be set such that 6000 products per hour are transported by the inspection line. At such a line speed each product may pass the inspection station at a velocity which is such that a very effective and reliable inspection by an inspector takes place. This means that the supply line may run at 12000 products per hour in case that two inspection lines are used.

In an embodiment, the system comprises one discharge transport line, wherein the second product transfer system is arranged for successively transferring products from inspection product carriers to respective second product carriers of the discharge transport line, thereby merging the products from all of the at least two inspection lines to the single discharge transport line. In such an embodiment, downstream of the inspection stations, products from the at least two inspection lines are merged back into one discharge line by the second transfer system. So, the single discharge transport line may run at the same increased speed as the single supply transport line. In an embodiment, the discharge transport line may be a continuation of the supply transport line, that means that first product carriers from which products are transferred to an inspection line continue their movement towards the second transfer system where products are transferred back to those carriers, then acting as the second product carriers.

The inspection of the products may be performed manually, by one or more individuals per inspection station.

The products passing said inspection station while being transported by the associated inspection line during use may be in the form of a continuous movement of products or may be in the form of an indexing movement of products along the inspection station.

In an embodiment, the first product transfer system is arranged for evenly distributing the products over all of the at least two inspection lines.

In an embodiment, the system comprises exactly two inspection lines. The provision of exactly two inspection lines allows reduction of the line speed for the purpose of inspection by half, which in most cases is sufficient for the purpose of obtaining a high supply and discharge transport line speed while safeguarding an effective and reliable inspection.

In an embodiment, for the purpose of distributing the products over all of the at least two inspection lines, the first product transfer system is arranged for transferring in an alternating manner products from successive first product carriers of the supply transport line to respective inspection product carriers of a first and of a second of the two inspection lines. This way, the products are evenly distributed over the two inspection lines so that both the inspection lines can be run at an equal, reduced, speed.

In an embodiment, the first product transfer system has at least two first product transfer devices, each arranged for transferring products from first product carriers of the supply transport line to respective inspection product carriers of one of the at least two inspection lines. This way, the transfer of the products can be provided for in a relatively easy manner. The number of first product transfer devices corresponds to the number of inspections lines. Each first product transfer device may be carrousel-like.

In an embodiment, each first product transfer device comprises a first buffer track having first buffer product carriers, wherein the first product transfer device is arranged for transferring products from first product carriers of the supply transport line to respective first buffer product carriers and from the first buffer product carriers to respective inspection product carriers of the associated inspection line. This way, the products can be transferred to the inspection lines more easily.

In an embodiment, similarly, the second product transfer system has at least two second product transfer devices, each arranged for transferring products from inspection product carriers of one of the at least two inspection lines to second product carriers of the discharge transport line. This way, the transfer of the products can be provided for in a relatively easy manner.

In an embodiment, each second product transfer device comprises a second buffer track having second buffer product carriers, wherein the second product transfer device is arranged for transferring products from inspection product carriers of the associated inspection line to respective second buffer product carriers and from second buffer product carriers to respective second product carriers of the discharge transport line. This way, the products can be transferred from the inspection lines to the single discharge transport line more easily.

An exemplary first transfer device and/or an exemplary second transfer device may each be formed as, or similar to, a device having an 'input station 4', 'transfer hooks 75 moving along guide rails 66' and 'output station 5' as disclosed in U.S. Pat. No. 4,597,133, which is hereby incorporated herein by reference in its entirety. The mentioned transfer hooks 75 moving along guide rails 66 may then constitute a buffer track as described above. Another exemplary first transfer device and/or an exemplary second transfer device may each be formed as, or similar to, a system 1 or 100 as disclosed in international patent application WO2019/212335A1, which is hereby incorporated herein by reference in its entirety.

In an embodiment, the system further comprises a control system having a processor and a memory element for storing thereon data relating to an individual product carried by a specific first product carrier of the supply transport line, the control system being operatively connected to the first and second transfer systems, and arranged for associating said data to a specific inspection product carrier of the inspection line to which said product is transferred by the first transfer system, and for associating said data to a specific second product carrier of the discharge transport line to which said product is transferred from said inspection product carrier by the second transfer system. This way, irrespective of the transfers of the product, the data relating to each product is maintained. The data may comprise data relating to a weight of the product and/or to the quality of the product, for example.

In an embodiment, the control system is further arranged for associating said data to a specific first buffer product carrier to which said product is transferred by the first transfer system.

In an embodiment, the control system is further arranged for associating said data to a specific second buffer product carrier to which said product is transferred by the second transfer system.

In an embodiment, the control system is further configured to control the first transfer system in such a manner that products are selectively transferred to a specific inspection line of the at least two inspection lines, preferably based on data relating to the products. This may be achieved by an embodiment of the first transfer system having selectively controllable transfer elements such as pushers, which may be actuated by an actuator such as a solenoid or pneumatical cylinder and which are arranged to transfer a product in dependence of a control signal from the control system. The selective transfer may be performed in an alternating manner or be performed based on product data such as weight or quality, for example. This means that poultry slaughter products of different weight grades may be transferred to separate inspection lines, or products which may have already been identified, such as using upstream automated equipment like a camera system, as potentially having a relatively low or high quality, or having a potential defect for example, may selectively be transferred to one of the inspection lines, for example.

In an embodiment, the supply transport line and/or the discharge transport line is an overhead conveyor having a driven transport chain to which carriers, either being the first product carriers of the supply transport line or the second product carriers of the discharge transport line, formed as shackles, or, suspension hooks, are connected at regular intervals and from which shackles poultry products are suspended by their legs, preferably by their ankle joints.

The supply transport line may have first product carriers being of a different type than second product carriers of the discharge transport line.

The present invention also relates to a method, of inspecting poultry slaughter products using a system according to the invention as described above, the method comprising the steps of:

supplying, using the supply transport line, poultry slaughter products to be inspected;

successively transferring, using the first product transfer system, the products from first product carriers of the supply transport line to respective inspection product carriers while distributing the products over all of the at least two inspection lines;

inspecting, at the inspection stations along each of the at least two inspection lines, products passing the respective inspection station while being transported by the associated inspection line;

successively transferring, using the second product transfer system, the products, which have been inspected, from the inspection product carriers to respective second product carriers of the at least one discharge transport line; and discharging, using the at least one discharge transport line, the products.

In an embodiment of a system comprising one discharge transport line, the step of successively transferring the products which have been inspected comprises successively transferring, using the second product transfer system, the products, which have been inspected, from the inspection product carriers to respective second product carriers of the one discharge transport line, thereby merging the products from all of the inspection lines to the single discharge transport line.

Effects of the method according to the invention are similar to effects of the system according to the invention and vice versa. Embodiments of the system of the invention apply in an analogous manner to the method of the invention, and vice versa.

In an embodiment, a transport line speed of each of the inspection lines is smaller than a transport line speed of the supply and of the discharge transport lines. In an embodiment of the method using a system having exactly two inspection lines, a line speed of each of the two inspection lines is at least approximately equal to half of the line speed of the supply transport line and of the discharge transport line, preferably wherein a line speed of each of the two inspection lines is about 6000 products per hour.

BRIEF DESCRIPTION OF THE DRAWINGS

The present invention will be explained below by means of the description of preferred embodiments of systems and methods according to the invention, with reference to the following highly schematic figures, in which.

DETAILED DESCRIPTION OF VARIOUS EMBODIMENTS

Figure 1:
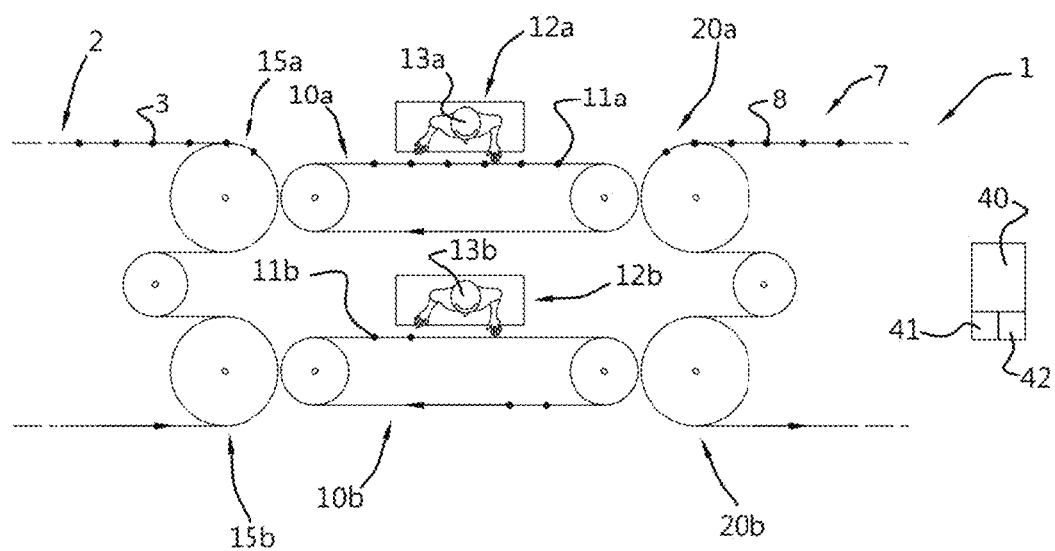
FIG. 1 shows a schematical representation of the principle of an embodiment of a system according to the invention, in top view.
Figure 3:
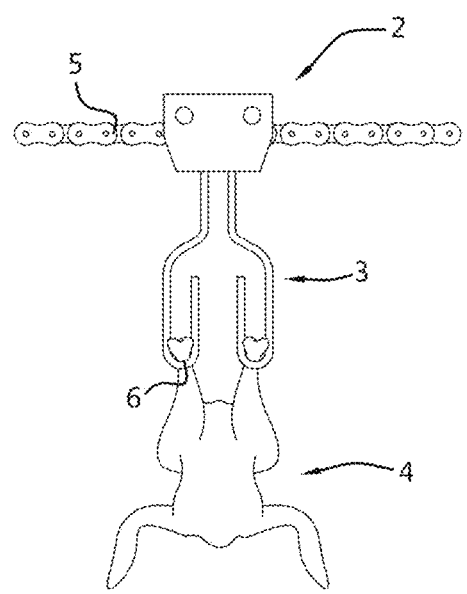
FIG. 3 shows a schematical representation of a first product carrier in side view.

FIG. 1 shows a system 1 for inspecting poultry slaughter products 4. The poultry slaughter products may be eviscerated chicken slaughter products. The system 1 comprises a supply transport line 2, comprising successive first product carriers 3 (only a few of the carriers are shown in the figures). The supply transport line 2 may be an overhead conveyor having a driven transport chain 5 to which carriers 3 formed as shackles, or, suspension hooks, are connected from which shackles poultry products 4 are suspended by their legs, preferably by their ankle joints 6. See FIG. 3.

The system also has a discharge transport line 7, comprising successive second product carriers 8 which may also be formed as said shackles. Further, the system 1 has two inspection lines 10a,b each comprising successive inspection product carriers 11a,b. Each of said first, second and inspection product carriers is configured to carry and transport a respective one of the products 4. The system further comprises an inspection station 12a,b along each of the inspection lines 10a,b, each inspection station 12a,b being arranged for inspecting products passing said inspection station while being transported by the associated inspection line during use. An individual 13a,b present at the inspection location 12a,b may perform a manual inspection.

The system 1 has a first product transfer system 15a,b for successively transferring products 4 from first product carriers 3 to respective inspection product carriers 11a,b while distributing the products 4 over all of the two inspection lines 10a,b. For the purpose of distributing the products 4 over all of the two inspection lines 10a,b, the first product transfer system 15a,b is arranged for transferring in an alternating manner products from successive first product carriers 3 of the supply transport line 2 to respective inspection product carriers 11a,b of a first 10a and of a second 10b of the two inspection lines. This means that after that a poultry slaughter product 4 has been transferred from a first product carrier 3 to an inspection carrier 11a of the inspection line 10a, the successive product, that means the product carried by the next, subsequent carrier 3, will be transferred to an inspection carrier 11b of the other inspection line 10b, and so on. As shown, the first product transfer system 15a,b has two carrousel-like first product transfer devices 15a and 15b, respectively, each associated with one of the inspection lines 10a,b as FIG. 1 shows. The first product transfer device 15a is arranged for transferring products 4 from first product carriers 3 of the supply transport line 2 to respective inspection product carriers 11a of the inspection line 10a, while the other first product transfer device 15b is arranged for transferring products 4 from first product carriers 3 of the supply transport line 2 to respective inspection product carriers 11b of the inspection line 10b.

The system 1 also has a second product transfer system 20a,b for successively transferring products 4 from inspection product carriers 11a,b to respective second product carriers 8 of the discharge transport line 7, thereby merging the products 4 from both the inspection lines 10a,b to the discharge transport line 7. The second product transfer system 20a,b has two second product transfer devices 20a and 20b, each associated with one of the inspection lines 10a,b as FIG. 1 shows. The second product transfer device 20a is arranged for transferring products 4 from inspection product carriers 11a of the inspection line 10a to second product carriers 8 of the discharge transport line 7. The other second product transfer device 20b is arranged for transferring products 4 from inspection product carriers 11b of the inspection line 10b to second product carriers 8 of the discharge transport line 7.

Figure 2:
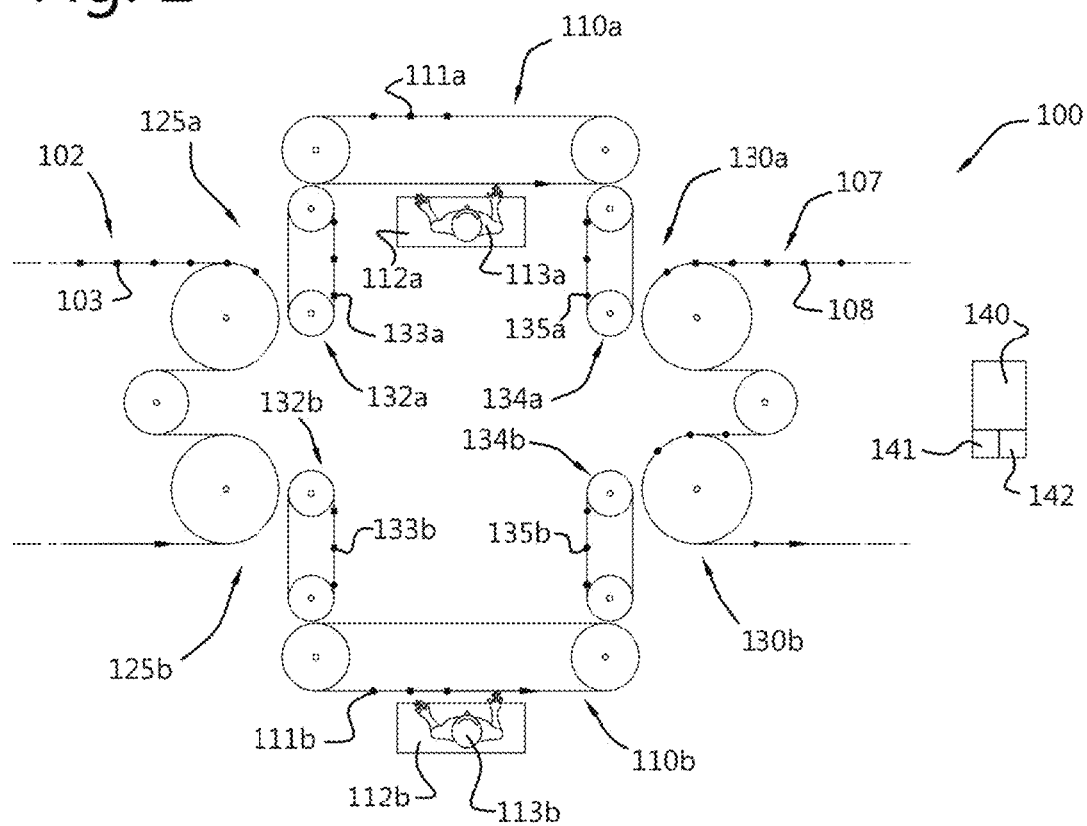
FIG. 2 shows a schematical representation of the principle of a further embodiment of a system according to the invention, in top view.

FIG. 2 shows a system 100, which is a further embodiment of a system according to the invention. Components which are equal to or at least function in a similar manner as components of system 1 have been identified by reference numerals corresponding to that of components of system 1, but to which 100 has been added.

The system 100, like system 1, has a supply transport line 102 comprising successive first product carriers 103, two inspection lines 110a and 110b, respectively comprising successive inspection product carriers 111a and 111b, and a discharge transport line 107 comprising successive second product carriers 108. The system further comprises a respective inspection station 112a,b along each of the inspection lines 110a,b, each inspection station 112a,b being arranged for inspecting products passing said inspection station while being transported by the associated inspection line during use. An individual 113a,b present at the inspection location 112a,b may perform a manual inspection.

The system 100 has a first product transfer system 125a,b having two first product transfer devices 125a and 125b which comprise a respective first buffer track 132a and 132b. The first buffer tracks 132a,b have respective first buffer product carriers 133a,b. The first transfer device 125a is arranged for transferring products 4 from first product carriers 103 of the supply transport line 102 to respective first buffer product carriers 133a and from first buffer product carriers 133a to respective inspection product carriers 111a of the associated inspection line 110a. The same holds for the other first transfer device 125b which is arranged for transferring products 4 from first product carriers 103 of the supply transport line 102 to respective first buffer product carriers 133b and from first buffer product carriers 133b to respective inspection product carriers 111b of the associated inspection line 110b.

The second product transfer system 130a,b successively transfers products 4 from inspection product carriers 111a,b to respective second product carriers 108 of the discharge transport line 107, thereby merging the products 4 from both the inspection lines 110a,b to the discharge transport line 107. The second product transfer system 130a,b has two second product transfer devices 130a and 130b, each associated with one of the inspection lines 110a,b as FIG. 2 shows and each having a respective second buffer track 134a and 134b. The second buffer tracks 134a,b have respective second buffer product carriers 135a,b. The second product transfer device 130a is arranged for transferring products 4 from inspection product carriers 111a of the inspection line 110a to respective second buffer product carriers 135a and from second buffer product carriers 135a to second product carriers 108 of the discharge transport line 107. Similarly, the other second product transfer device 130b is arranged for transferring products 4 from inspection product carriers 111b of the inspection line 110b to respective second buffer product carriers 135b and from second buffer product carriers 135b to second product carriers 108 of the discharge transport line 107.

Figure 4:
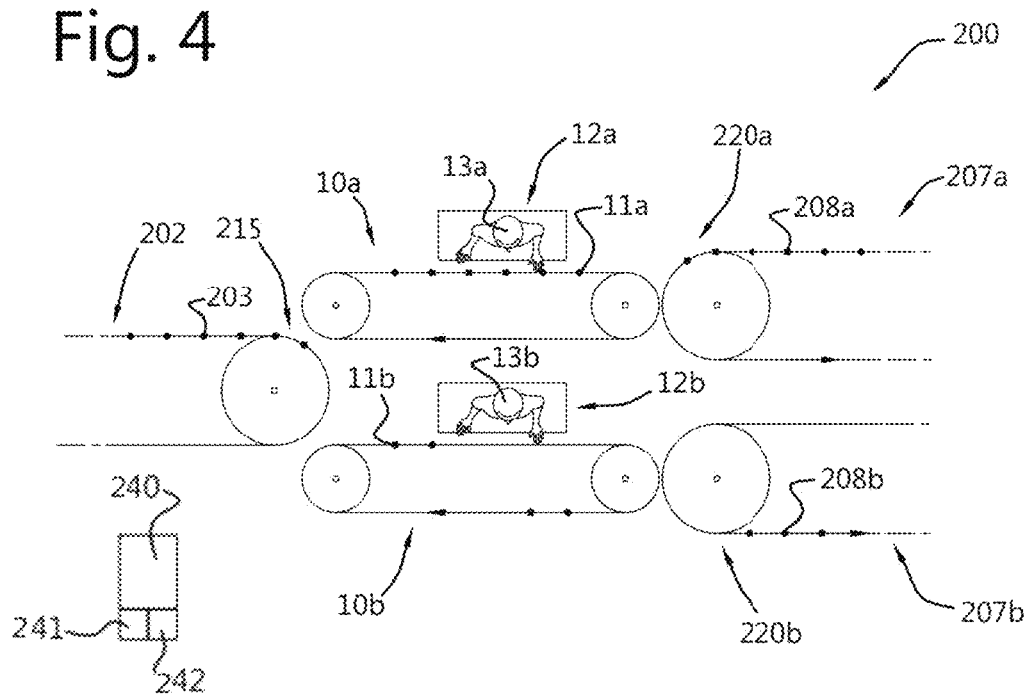
FIG. 4 shows a schematical representation of the principle of a still further embodiment of a system according to the invention, in top view.

FIG. 4 shows a system 200, which is a further embodiment of a system according to the invention. Components which at least function in a similar manner as components of systems 1 and 100 have been identified by reference numerals corresponding to that of components of system 1, but to which 200 has been added.

The system 200, has a supply transport line 202 comprising successive first product carriers 203, two inspection lines 10a and 10b, like system 1, respectively comprising successive inspection product carriers 11a and 11b. While system 1 has individual carrousel-like transfer devices 15a,b for each inspection line 10a,b, the system 200 has a single carrousel-like first product transfer system 215 as further detailed below. However, in a further embodiment, the invention provides a system equal to system 200 but which system, instead of the supply transport line 202 and first product transfer system 215, has the supply transport line 2 and the first product transfer system 15a,b as shown in FIG. 1 and described above.

Other than systems 1 and 100, the system 200 has two individual discharge transport lines 107a and 107b each comprising respective successive second product carriers 208a and 208b. The system 200 further comprises a respective inspection station 12a,b along each of the inspection lines 10a,b, each inspection station 12a,b being arranged for inspecting products passing said inspection station while being transported by the associated inspection line during use. An individual 13a,b present at the inspection location 12a,b may perform a manual inspection.

The first product transfer system 215 is arranged for successively transferring products 4 from first product carriers 203 to respective inspection product carriers 11a,b while distributing the products 4 over all of the two inspection lines 10a,b. For the purpose of distributing the products 4 over all of the two inspection lines 10a,b, the first product transfer system 215 is arranged for transferring in an alternating manner products from successive first product carriers 203 of the supply transport line 202 to respective inspection product carriers 11a,b of a first 10a and of a second 10b of the two inspection lines.

The system 200 also has a second product transfer system 220a,b for successively transferring products 4 from inspection product carriers 11a,b to respective second product carriers 8 of the discharge transport lines 207a,b. The second product transfer system 220a,b has two second product transfer devices 220a and 220b, each associated with one of the inspection lines 10a,b as FIG. 4 shows. The second product transfer device 220a is arranged for transferring products 4 from inspection product carriers 11a of the inspection line 10a to second product carriers 208a of the discharge transport line 207. The other second product transfer device 220b is arranged for transferring products 4 from inspection product carriers 11b of the inspection line 10b to second product carriers 208b of the discharge transport line 207b.

In a further embodiment, the invention provides a system equal to system 1 but which system, instead of the discharge transport line 7 and second product transfer system 20a,b, has the two individual discharge transport lines 107a and 107b and second product transfer system 220a,b.

The systems 1, 100 and 200 further comprise a respective control system 40; 140; 240 having a processor 41; 141; 241 and a memory element 42; 142; 242 for storing thereon data relating to an individual product 4 carried by a specific first product carrier 3; 103; 203 of the supply transport line 2; 102, 203 the control system being operatively connected to the first product transfer systems 15a,b; 125a,b; 215 and to second product transfer systems 20a,b; 130a,b; 220a,b. The data may comprise weight data, and/or quality related data, for example.

The control systems 40; 140; 240 are arranged for associating said data to a specific inspection product carrier 11a,b; 111a,b of the inspection line to which said product is transferred by the first transfer system, and for associating said data to a specific second product carrier 8; 108; 208 of the discharge transport line to which said product is transferred from said inspection product carrier by the second transfer system.

The control system 140 is additionally arranged for associating said data to a specific first buffer product carrier 113a,b to which said product is transferred by the first transfer system 125a,b, and for associating said data to a specific second buffer product carrier 135a,b to which said product is transferred by the second transfer system 130a,b.

The single carrousel-like first product transfer system 215 of system 200 of FIG. 4 is arranged for the selective transferring of products 4 to the two inspection lines 10a,b, the selective transferring being performed as described above, based on a control signal from the controller 240 having a processor 241 and a memory element 242 on which data may be stored relating to individual products 4. The selective transferring may thus be performed based on product weight, for example.

According to an exemplary method according to the invention, using the system 1 according to the invention, the following steps are executed:

supplying, using the supply transport line 2, poultry slaughter products 4 to be inspected;

successively transferring, using the first product transfer system 15a,b, the products 4 from first product carriers 2 to respective inspection product carriers 11a,b while distributing the products over the two inspection lines 10a,b;

inspecting, at the inspection stations 12a,b along each of the at least two inspection lines 10a,b, products 4 passing the respective inspection station while being transported by the associated inspection line;

successively transferring, using the second product transfer system 20a,b, the products 4, which have been inspected, from the inspection product carriers to respective second product carriers 8 of the discharge transport line 7, thereby merging the products from the two inspection transport lines to the discharge transport line; and discharging, using the discharge transport line 7, the products 4 for the purpose of further processing steps.

The similar applies to a method using the system 100, wherein the transfer steps comprise a transfer of the products via the respective buffer tracks 132a,b and 134a,b. The similar applies to a method using the system 200, wherein the step of transferring using the second product transfer system 220a,b comprises transferring the products 4, which have been inspected, from the inspection product carriers to respective second product carriers 208a,b of the discharge transport lines 207a,b.

A transport line speed of each of the two inspection lines 11a,b; 111a,b may be set at half of a transport line speed of the supply transport line 2; 102; 202 and of the discharge transport line 7; 107; 207a,b. The line speed of each of the two inspection lines 11a,b; 111a,b may be set at about 6000 products 4 per hour.

Other variations to the disclosed embodiments can be understood and effected by those skilled in the art in practicing the claimed invention, from a study of the drawings, the disclosure, and the appended claims. The foregoing description provides embodiments of the invention by way of example only. For example, although the inspection station shown in FIGS. 1, 2 and 4 is arranged to enable a human inspector to perform an inspection of products passing said inspection station while being transported by the associated inspection line during use, the skilled person will understand that said inspection may alternatively be performed by a robot system. The scope of the present invention is defined by the appended claims. One or more of the objects of the invention are achieved by the appended claims.

The invention claimed is:

1. A system for inspecting poultry slaughter products, comprising:

a supply transport line comprising successive first product carriers;

at least two inspection lines comprising successive inspection product carriers;

at least one discharge transport line comprising successive second product carriers, wherein each of said first, second, and inspection product carriers are configured to carry and transport a respective one of the products;

a first product transfer system including a first carrousel rotating for successively transferring the products from the first product carriers of the supply transport line to the inspection product carriers while distributing the products over the at least two inspection lines according to a predetermined manner;

an inspection station along each of the at least two inspection lines, each inspection station arranged for inspecting the products passing said inspection station while being transported by a respective one of the at least two inspection lines; and a second product transfer system including a second carrousel rotating for successively transferring the products from the inspection product carriers to respective second product carriers of the at least one discharge transport line;

wherein the supply transport line is an overhead conveyor to which the first product carriers are formed as shackles or suspension hooks, from which the products are suspended;

wherein the supply transport line operates at a supply transport line speed greater than an inspection line speed of at least one of the two inspection lines.

2. The system according to claim 1, comprising a single discharge transport line, wherein the second product transfer system is arranged for successively transferring the products from the inspection product carriers to the second product carriers of the discharge transport line, wherein the products are merged from the at least two inspection lines to the single discharge transport line.

3. The system according to claim 1, comprising exactly two inspection lines.

4. The system according to claim 1, wherein the predetermined manner comprises the first product transfer system being arranged for transferring successively in an alternating the products from the first product carriers of the supply transport line to the inspection product carriers of a first and of a second of the two inspection lines.

5. The system according to claim 1, wherein the first product transfer system has at least two first product transfer devices, each arranged for transferring the products from first product carriers of the supply transport line to the inspection product carriers of one of the at least two inspection lines, respectively.

6. The system according to claim 1, further comprising a control system having a processor and a memory element for storing thereon data relating to an individual product carried by a specific first product carrier of the supply transport line, the control system being operatively connected to the first product transfer system and the second product transfer system, and arranged for
associating said data to a specific inspection product carrier of the inspection line to which said product is transferred by the first product transfer system, and for
associating said data to a specific second product carrier of the at least one discharge transport line to which said product is transferred from said inspection product carrier by the second product transfer system.

7. The system according to claim 1, wherein the second product transfer system has first and second product transfer devices, each arranged for transferring the products from the inspection product carriers of one of the at least two inspection lines to the second product carriers of the at least one discharge transport line.

8. The system according to claim 7, wherein each of the first product transfer devices comprises a first buffer track having first buffer product carriers is arranged for transferring the products from the first product carriers of the supply transport line to the first buffer product carriers and from the first buffer product carriers to the inspection product carriers of a respective one of the at least two inspection lines.

9. The system according to claim 8, wherein each of the second product transfer devices comprises a second buffer track having second buffer product carriers, and is arranged for transferring the products from the inspection product carriers of a respective one of the at least two inspection lines to the second buffer product carriers, and from the second buffer product carriers to the second product carriers of the at least one discharge transport line.

10. The system according to claim 9, further comprising a control system having a processor and a memory element for storing thereon data relating to an individual product carried by a specific first product carrier of the supply transport line, the control system being operatively connected to the first and second transfer systems, and arranged for
associating said data to a specific inspection product carrier of the inspection line to which said product is transferred by the first product transfer system, and for
associating said data to a specific second product carrier of the at least one discharge transport line to which said product is transferred from said inspection product carrier by the second transfer system.

11. The system according to claim 10, wherein the control system is further arranged for associating said data to a specific one of the first buffer product carriers to which said slaughter product is transferred by the first product transfer system.

12. The system according to claim 11, wherein the control system is further arranged for associating said data to a specific second buffer product carrier to which said product is transferred by the second transfer system.

13. The system according to claim 10, wherein the control system is further configured to control the first product transfer system in the predetermined manner that the products are selectively transferred to a specific inspection line of the at least two inspection lines, based on data relating to the products.

14. A method of inspecting poultry slaughter products using a system according to claim 1, the method comprising the steps of:
supplying, using the supply transport line, the products to be inspected;
successively transferring, using the first product transfer system, the products from first product carriers of the supply transport line to respective inspection product carriers while distributing the products over the at least two inspection lines;
inspecting, at the inspection stations along each of the at least two inspection lines, the products passing a respective one of the at least two inspection stations while being transported by a respective one of the at least two inspection lines;
successively transferring, using the second product transfer system, the products, which have been inspected, from the inspection product carriers to respective second product carriers of the at least one discharge transport line; and
discharging, using the at least one discharge transport line, the products.

15. The method according to claim 14, wherein the step of successively transferring the products which have been inspected comprises:
successively transferring, using the second product transfer system, the products, which have been inspected, from the inspection product carriers to the second product carriers of the one discharge transport line, wherein the products are merged from the at least two inspection lines to the discharge transport line.

16. The method according to claim 15, wherein the inspection line speed of each of the two inspection lines is at least approximately equal to half of the supply transport line speed of the supply transport line and of the discharge transport line.

17. The method according to claim 15, wherein a line speed of each of the two inspection lines is about 6,000 of the products per hour.

18. A system for inspecting products including poultry slaughter products, comprising
a supply transport line comprising successive first product carriers;
at least two inspection lines comprising successive inspection product carriers;
at least one discharge transport line comprising successive second product carriers, wherein each of said first, second and inspection product carriers are configured to carry and transport a respective one of the products;
a first product transfer system for successively transferring the products from the first product carriers of the supply transport line to the inspection product carriers while distributing the products over the at least two inspection lines according to a predetermined manner;
an inspection station along each of the at least two inspection lines, each inspection station arranged for inspecting the products passing said inspection station while being transported by a respective one of the at least two inspection lines during use; and
a second product transfer system for successively transferring the products from inspection product carriers to respective second product carriers of the at least one discharge transport line;
a control system having a processor and a memory element for storing thereon data relating to an individual product carried by a specific first product carrier of the supply transport line, the control system being operatively connected to the first and second product transfer systems, and arranged for associating said data to a specific inspection product carrier of the inspection line to which said product is transferred by the first product transfer system, and for associating said data to a specific second product carrier of the at least one discharge transport line to which said product is transferred from said inspection product carrier by the second product transfer system.

19. The system according to claim 18, wherein an inspection line speed of each of the two inspection lines is at least approximately equal to half of a supply transport line speed of the supply transport line and of the discharge transport line.

20. A method of inspecting poultry slaughter products, the method comprising the steps of:
supplying the products to be inspected using a supply transport line comprising successive first product carriers;
successively transferring the products to at least two inspection lines using a first product transfer system including a first carrousel rotating for transferring the products from the first product carriers of the supply transport line to the inspection product carriers while distributing the products over the at least two inspection lines according to a predetermined manner;
inspecting the products at an inspection station located along each of the at least two inspection lines as the products are transported along the at least two inspection lines;

successively transferring the products, which have been inspected, from the at least two inspection lines to at least one discharge transport line using a second product transfer system, including a second carrousel rotating for transferring the products from the inspection product carriers to respective second product carriers of the at least one discharge transport line;

wherein the supply transport line operates at a supply transport line speed greater than an inspection line speed of at least one of the two inspection lines.

* * * * *